United States Patent
West et al.

(10) Patent No.: US 7,617,687 B2
(45) Date of Patent: Nov. 17, 2009

(54) METHODS AND SYSTEMS OF VARIABLE EXTRACTION FOR GAS TURBINE CONTROL

(75) Inventors: James A. West, Simpsonville, SC (US); Robert T. Thatcher, Greer, SC (US)

(73) Assignee: General Electric Company, Schenectady, NY (US)

( * ) Notice: Subject to any disclaimer, the term of this patent is extended or adjusted under 35 U.S.C. 154(b) by 705 days.

(21) Appl. No.: 11/307,950

(22) Filed: Feb. 28, 2006

(65) Prior Publication Data
US 2007/0199330 A1 Aug. 30, 2007

(51) Int. Cl.
*F02C 9/00* (2006.01)
(52) U.S. Cl. .......................... 60/795; 60/782
(58) Field of Classification Search ............... 60/772, 60/782, 783, 795, 773, 781, 39.12
See application file for complete search history.

(56) References Cited

U.S. PATENT DOCUMENTS

| | | | | |
|---|---|---|---|---|
| 5,386,686 A | * | 2/1995 | Chretien et al. | 60/783 |
| 5,666,800 A | * | 9/1997 | Sorensen et al. | 60/781 |
| 5,740,673 A | * | 4/1998 | Smith et al. | 60/783 |
| 5,802,875 A | * | 9/1998 | Drnevich | 62/656 |
| 5,865,023 A | * | 2/1999 | Sorensen et al. | 60/775 |
| 5,901,547 A | * | 5/1999 | Smith et al. | 60/773 |
| 6,550,234 B2 | * | 4/2003 | Guillard | 60/39.6 |
| 6,945,030 B2 | | 9/2005 | Hirayama et al. | |
| 2004/0255595 A1 | * | 12/2004 | Morgan et al. | 60/773 |
| 2005/0204745 A1 | * | 9/2005 | Hirayama et al. | 60/773 |
| 2007/0204625 A1 | * | 9/2007 | Thatcher et al. | 60/782 |
| 2007/0234729 A1 | * | 10/2007 | West et al. | 60/772 |

* cited by examiner

*Primary Examiner*—Michael Cuff
*Assistant Examiner*—Phutthiwat Wongwian
(74) *Attorney, Agent, or Firm*—Sutherland Asbill & Brennan LLP

(57) ABSTRACT

A method of controlling a load of a gas turbine engine that is part of an integrated gasification combined-cycle power generation system, which includes an air separation unit, that includes the steps of: (1) extracting an amount of compressed air that is compressed by a turbine compressor; (2) supplying the extracted amount of compressed air to the air separation unit; and (3) varying the amount of compressed air extracted from the turbine compressor based upon a desired load for the gas turbine engine.

18 Claims, 6 Drawing Sheets

METHODS AND SYSTEMS OF VARIABLE EXTRACTION FOR GAS TURBINE CONTROL

TECHNICAL FIELD

This present application relates generally to methods for controlling the operation of gas turbine engines. More specifically, but not by way of limitation, the present application relates to methods for controlling the operation of a gas turbine engine that is part of a integrated gasification combined-cycle power generation system by varying the extraction of compressed air from the turbine compressor.

BACKGROUND OF THE INVENTION

In current integrated gasification combined-cycle ("IGCC") power generation systems, an air separation unit is used to supply $O_2$ to a gasifier, which then generates partially combusted gases for use as fuel in a gas turbine. Compressed air is generally supplied to the air separation unit from both a main air compressor and/or through extraction from the discharge of the gas turbine compressor. Currently, the amount of compressed air extracted from the turbine compressor discharge is approximately a fixed percentage of compressor flow and is based only on the needs of the external demand of the air separation unit.

In such systems, the goal for the operation of the gas turbine is to satisfy desired load levels while maximizing efficiency. This includes allowing the gas turbine unit to operate at a desired maximum level load across changing ambient conditions without exceeding the maximum load level, while also respecting operational boundaries of the turbine. Operational boundaries, for example, include maximum allowable temperatures within the turbine or combustor components. Exceeding these temperatures may cause damage to turbine components or cause increased emissions levels. Another operational boundary includes a maximum compressor pressure ratio. Exceeding this limitation may cause the unit to surge, which may cause extensive damage to the turbine. Further, the turbine may have a maximum mach number, which indicates the maximum flow rate of the combusted gases as the gases exit the turbine. Exceeding this maximum flow rate may damage turbine components.

Accordingly, controlling the operation of the gas turbine to improve efficiency while satisfying operational limitations or requirements is a significant goal within the industry. Several known methods are used by turbine operators to control or limit the load of the turbine while attempting to satisfy this objective. These known methods include manipulating inlet bleed heat, the inlet guide vanes of the compressor, and/or turbine fuel supply.

Inlet bleed heat allows a turbine operator to bleed off the discharge air of the turbine compressor and recirculate the bleed air back to the compressor inlet. Because some of the compressor flow is recycled to the inlet, this method reduces the amount of flow through the compressor that expands through the turbine, which reduces the output of the turbine. This method of gas turbine load control may also raise the inlet temperature of the compressor inlet air by mixing the colder ambient air with the bleed portion of the hot compressor discharge air. This rise in temperature reduces the air density and, thus, the mass flow to the gas turbine. Although this approach may be used to allow the gas turbine unit to operate at a maximum level loaded across changing ambient conditions (while respecting operational boundaries), it comes with a cost, as it reduces the thermal efficiency of the gas turbine.

Closure of the inlet guide vanes, which control the flow of air to the turbine compressor, is another common method of decreasing the mass flow across the gas turbine, which, in turn, may be used to control or limit turbine load. Closing the inlet guide vanes may restrict the passage of air to the compressor and, thus, decreases the amount of air entering the compressor. This approach also may be used to allow the gas turbine unit to operate at a maximum level load across changing ambient conditions (while respecting operational boundaries), but it also reduces the thermal efficiency of the gas turbine by operating the compressor away from its optimum design point.

Finally, the turbine load may be controlled or limited by decreasing the flow of fuel to the combustor. This will decrease the combustion temperature of the turbine and the output of the gas turbine engine. In the case of falling ambient temperatures, such a measure may allow the turbine to maintain a maximum level load. However, as is known in the art, the reduction in combustion temperature decreases the efficiency of the gas turbine engine.

These known control methods thus adversely affect the efficiency of the gas turbine engine. Further, none of these control methods take advantage of the specific components that are part of an IGCC power generation system to allow the system to operate more efficiently. Thus, there is a need for a more efficient method for controlling the load of the gas turbine used in an IGCC power generation system.

BRIEF DESCRIPTION OF THE INVENTION

The present application thus may describe a method of controlling a load of a gas turbine engine that is part of an integrated gasification combined-cycle power generation system, which includes an air separation unit, that may include the steps of: (1) extracting an amount of compressed air that is compressed by a turbine compressor; (2) supplying the extracted amount of compressed air to the air separation unit; and (3) varying the amount of compressed air extracted from the turbine compressor based upon a desired load for the gas turbine engine.

In some embodiments, the method further may include the step of supplying the air separation unit with a supply of compressed air from a main air compressor. The amount of compressed air supplied to the air separation unit by the main air compressor may be varied based upon the amount of compressed air extracted from the turbine compressor. A combined supply of compressed air may include the amount of compressed air supplied to the air separation unit by the main air compressor and the amount of compressed air extracted from the turbine compressor. The combined supply of compressed air may be a supply of compressed air that satisfies the total supply of compressed air required by the air separation unit.

In some embodiments, the step of varying the amount of compressed air supplied to the air separation unit by the main air compressor based upon the amount of compressed air extracted from the turbine compressor may include the step of decreasing the amount of compressed air supplied to the air separation unit by the main air compressor when the amount of compressed air extracted from the turbine compressor is increased. The amount by which the compressed air supplied to the air separation unit by the main air compressor is decreased may be approximately the same as the amount by which the amount of compressed air extracted from the turbine compressor is increased. The step of varying the amount of compressed air supplied to the air separation unit by the main air compressor based upon the amount of compressed air extracted from the turbine compressor may include the step of increasing the amount of compressed air supplied to the air separation unit by the main air compressor when the amount of compressed air extracted from the turbine compressor is decreased. The amount by which the compressed air supplied to the air separation unit by the main air compressor is increased may be approximately the same as the amount by which the amount of compressed air extracted from the turbine compressor is decreased.

In some embodiments, the method further may include the step of varying the amount of compressed air extracted from the turbine compressor based upon the ambient temperature. The step of varying the amount of compressed air extracted from the turbine compressor based upon the ambient temperature may include increasing the amount of compressed air extracted from the turbine compressor as the ambient temperature decreases. The step of varying the amount of compressed air extracted from the turbine compressor based upon the ambient temperature includes decreasing the amount of compressed air extracted from the turbine compressor as the ambient temperature increases.

In some embodiments, the step of varying the amount of compressed air extracted from the turbine compressor based upon the desired load of the gas turbine engine may include the steps of: (1) measuring an actual load of the gas turbine engine; and (2) comparing the actual load of the gas turbine to the desired load of the gas turbine engine. The amount by which the compressed air extracted from the turbine compressor is varied may be based on the comparison of the actual load of the gas turbine against the desired load of the gas turbine engine. The method may include the step of increasing the amount of compressed air extracted from the turbine compressor if the actual load of the gas turbine is greater than the desired load of the gas turbine engine. Further, the method may include the step of decreasing the amount of compressed air extracted from the turbine compressor if the actual load of the gas turbine is measured to be less than the desired load of the gas turbine engine.

The present application further may describe a system for controlling a load of a gas turbine engine that is part of an integrated gasification combined-cycle power generation system that includes: (1) an air separation unit that includes a turbine compressor that compresses air; (2) means for extracting an amount of compressed air from the turbine compressor and means for supplying the extracted amount of compressed air to the air separation unit; and (3) means for varying the amount of compressed air extracted from the turbine compressor based upon a desired load for the gas turbine engine.

In some embodiments, the system further may include means for measuring an actual load of the gas turbine. The means for varying the amount of compressed air extracted from the turbine compressor based upon a desired load for the gas turbine engine may include means for comparing the actual load of the gas turbine to the desired load of the gas turbine engine and means for varying the amount of compressed air extracted from the turbine compressor based on the comparison of the actual load of the gas turbine against the desired load of the gas turbine engine. The means for varying the amount of compressed air extracted from the turbine compressor based upon a desired load for the gas turbine engine may include a PID controller.

In some embodiments, the system further may include a main air compressor that supplies the air separation unit with a supply of compressed air from a main air compressor. The system may include means for varying the amount of compressed air supplied to the air separation unit by the main air compressor. The amount of compressed air supplied to the air separation unit by the main air compressor may be varied based upon the amount of compressed air extracted from the turbine compressor.

DETAILED DESCRIPTION OF THE INVENTION

Figure 1:
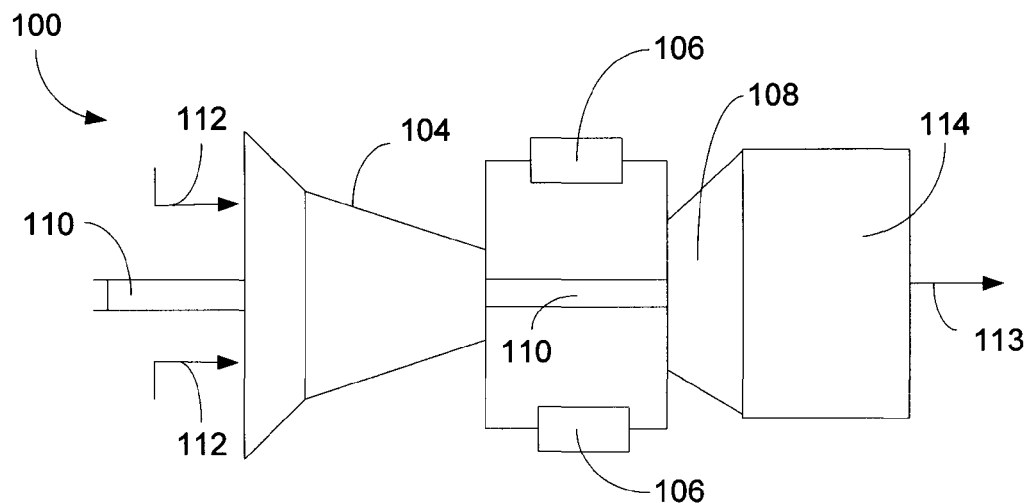
FIG. 1 is a schematic plan of an exemplary turbine that may be used with certain embodiments of the present application.

Referring now to the figures, where the various numbers represent like parts throughout the several views, FIG. 1 demonstrates a schematic illustration of an exemplary gas turbine engine 100 that may be used with certain embodiments of the present application. The gas turbine engine 100 may include a compressor, which also may be known as a turbine compressor 104, a combustor 106, and a turbine 108 connected serially. The turbine compressor 104 and the turbine 108 may be coupled by a shaft 110, which also may couple the turbine 108 and drive an electrical generator (not shown). In certain embodiments, the gas turbine engine 100 may be a 7FB engine, which is commercially available from General Electric Company, although the gas turbine engine 100 illustrated and described herein is exemplary only. Accordingly, the gas turbine engine 100 is not limited to the gas turbine engine shown in FIG. 1 and described herein, but rather, the gas turbine engine 100 may be any gas turbine engine. For example, but not by way of limitation, in an alternative embodiment, the gas turbine engine 100 may be a multi-shaft gas turbine engine having two shafts for separately driving the electrical generator (not shown) and turbine compressor 104.

In operation, air (as indicated by arrows 112) may flow into the gas turbine engine 100 through the turbine compressor 104 and may be compressed. Compressed air then may be channeled to the combustor 106 where it may be mixed with fuel and ignited. The expanding hot gases from the combustor 106 may drive the rotating turbine 108 and may exit (as indicated by an arrow 113) the gas turbine engine 100 through an exhaust diffuser 114. Additionally, in some embodiments, exhaust gases from the turbine engine 100 may be supplied to a heat recovery steam generator (not shown) that generates steam for driving a steam turbine (not shown).

Figure 2:
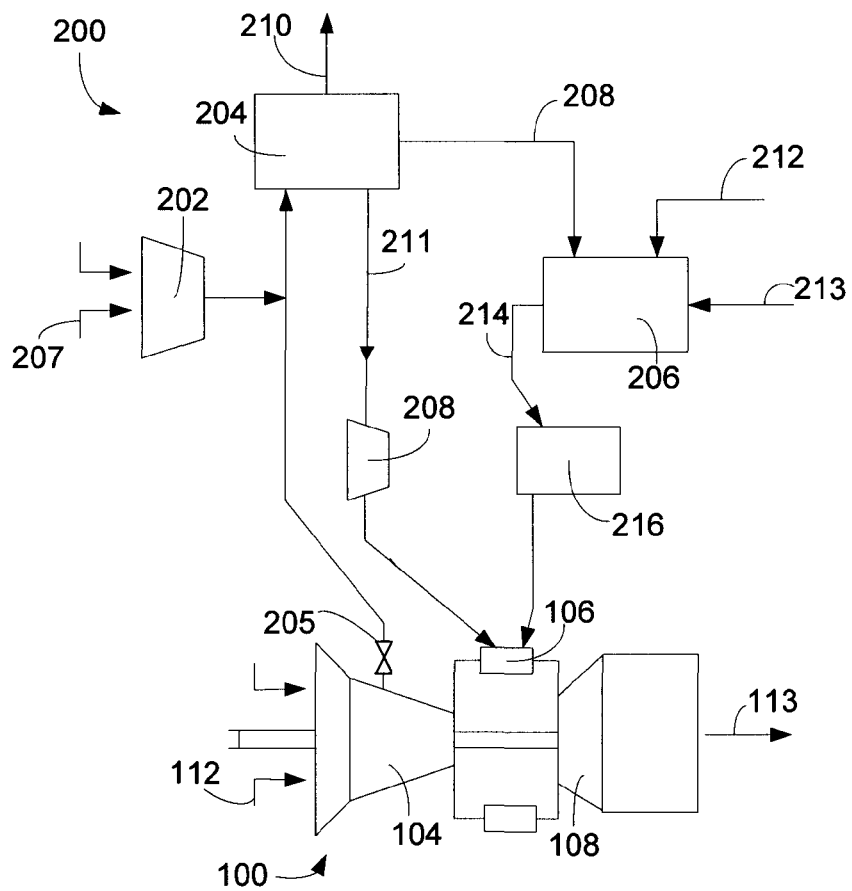
FIG. 2 is a schematic plan of an exemplary integrated gasification combined-cycle ("IGCC") power generation system that may be used with certain embodiments of the present application.

FIG. 2 is a schematic diagram of an exemplary integrated gasification combined-cycle ("IGCC") power generation system 200 that may be used with certain embodiments of the present application. Though, those of ordinary skill will appreciate that that the current application is not limited for use with the IGCC power generation system 200 and that it may be used with other systems that include a gas turbine engine. The IGCC power generation system 200 may incorporate the gas turbine engine 100 described above. The IGCC system 200 may further include a main air compressor 202, an air separation unit 204 coupled in flow communication to the main air compressor 202 and the turbine compressor 104, a gasifier 206 coupled in flow communication to the air separation unit 204, the combustor 106 coupled in flow communication to the gasifier 206, and the turbine 108. The arrows in FIG. 2 indicate flow directions.

In general operation, the main compressor 202, which may include one or more compressors known in the art, may compress ambient air (the flow of which is indicated by arrows 207). The compressed air from the main compressor 202 may be channeled to the air separation unit 204. Compressed air from the turbine compressor 104 may be extracted and supplied to air separation unit 204. The extraction of the compressed air from the turbine compressor 104 may be completed by manifolding the compressed air from the turbine compressor 104 into a pipe and routing the extracted compressed air to the air separation unit 204. A valve 205, such as a butterfly valve or other similar valve, may be installed in the pipe to control the amount of compressed air that is extracted from the turbine compressor 104. Those of ordinary skill in the art will appreciated that other methods and systems may be used to extract an amount of compressed air from the turbine compressor 104 and deliver it to the air separation unit 204. The air separation unit 204, thus, may receive the supply of compressed air necessary for its function from the main compressor 202 and from the compressed air extracted from the turbine compressor 104.

The air separation unit 204 then may use the supply of compressed air to generate oxygen for use by the gasifier 206 pursuant to methods known in the art. More specifically, the air separation unit 204 may separate the compressed air into separate flows of oxygen (the flow of which is represented by a pathway 208) and a gas by-product, sometimes referred to as a "process gas." The process gas generated by the air separation unit 204 may include nitrogen and will be referred to herein as "nitrogen process gas." The nitrogen process gas also may include other gases, such as oxygen, argon, etc. In some embodiments, the nitrogen process gas may include between about 95% and about 100% nitrogen.

The oxygen flow from the air separation unit 204 may be channeled to the gasifier 206 for use in generating partially combusted gases, referred to herein as "syngas," for use by the gas turbine engine 100 as fuel. In some known IGCC systems, at least some of the nitrogen process gas flow, a by-product of the air separation unit 204, may be vented to the atmosphere (the flow of which is represented by a pathway 210). In some known IGCC systems, some of other nitrogen process gas flow (the flow of which is represented by a pathway 211) may be supplied to a nitrogen boost compressor 208 and then fed into the combustor 106 to facilitate controlling emissions of the turbine 108.

The gasifier 206 may convert a mixture of fuel (the flow of which is represented by pathway 212), the oxygen supplied by the air separation unit 204 (the flow of which is represented by the pathway 208), steam (the flow of which is represented by pathway 213), and/or limestone (the flow of which is not shown) into an output of syngas for use by the gas turbine engine 100 as fuel pursuant to methods known in the art. Although the gasifier 206 may use many types of fuel, in some known IGCC systems, the gasifier 206 may use pulverized coal, petroleum coke, residual oil, oil emulsions, tarsands, and/or other similar fuels. In some known IGCC systems, the syngas generated by the gasifier 206 may include carbon dioxide, sulfur or other undesired contaminants. As known in the art, the syngas generated by the gasifier 206 (the flow of which is represented by pathway 214) may be cleaned by a clean-up device 216, which also may be known as a acid removal system, to remove some or all of these contaminants before being channeled to the combustor 106 for combustion thereof.

The power output from the gas turbine engine 100 may drive the electrical generator (not shown) that supplies electrical power to a power grid (not shown). Exhaust gas from the gas turbine engine 100 may be supplied to a heat recovery steam generator (not shown) that generates steam for driving steam turbine (not shown). Power generated by steam turbine may drive an electrical generator (not shown) that provides electrical power to the power grid. In some known IGCC systems, steam from a heat recovery steam generator also may be supplied to gasifier 206 for generating the syngas.

Figure 3A:
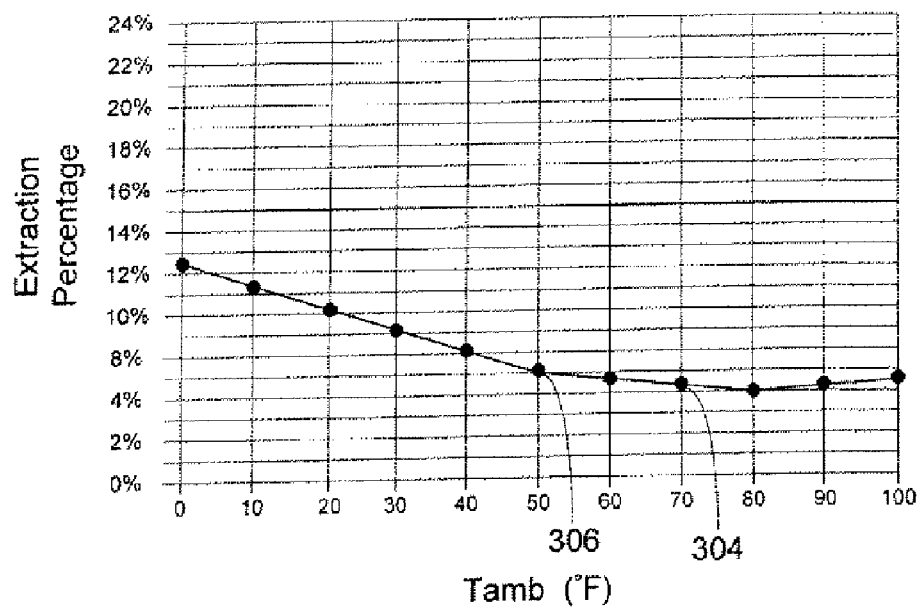
FIG. 3(a), 3(b) and 3(c) include several related plots that demonstrated results from an exemplary IGCC power generation system in which the level of extraction of compressed air from the turbine compressor is varied so that a maximum load for the turbine may be efficiently maintained through changing ambient conditions.
Figure 3B:
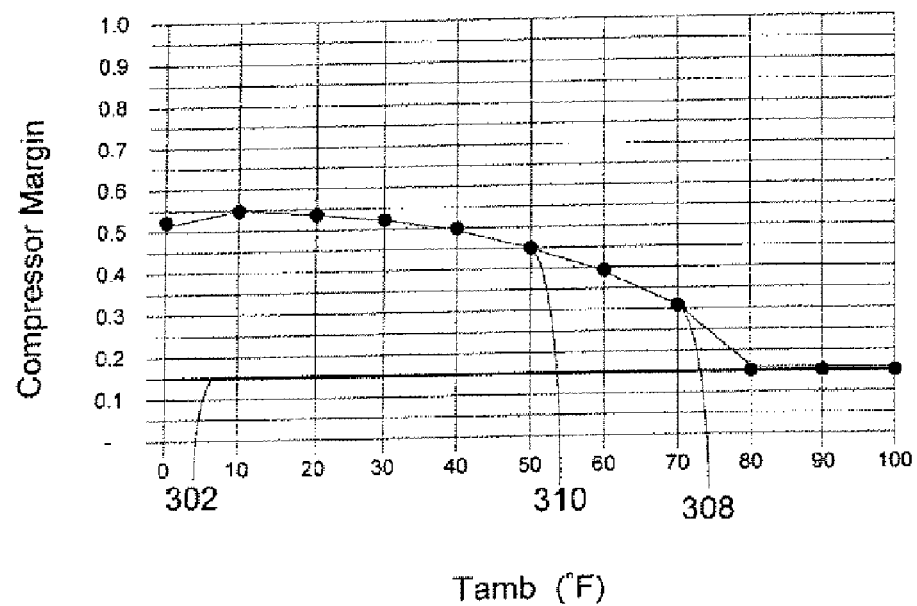
Figure 3C:
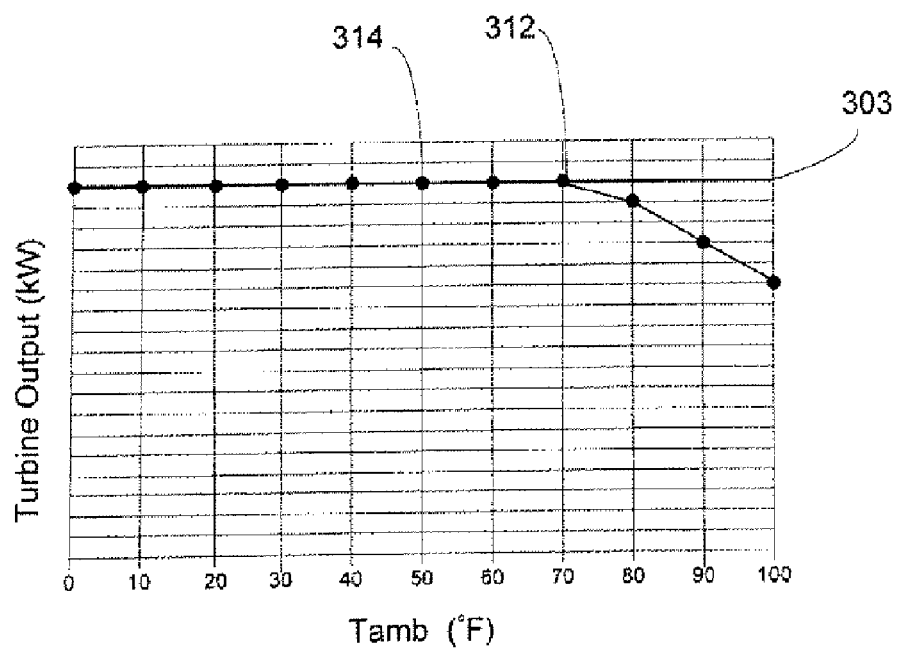

As part of the embodiments of the present application, the amount of compressed air extracted from the turbine compressor 104 and supplied to the air separation unit 204 may be varied as a means of controlling the load of the turbine 100 in the IGCC power system 200 and/or meeting the operability limits of the turbine 100. For example, FIG. 3 demonstrates the exemplary results of such turbine 100 control and operation. FIG. 3 includes several related plots that demonstrate exemplary operation of the gas turbine engine 100 in which the level of extraction of compressed air from the turbine compressor is varied so that a maximum load for the turbine may be efficiently maintained (and not exceeded) through changing ambient conditions. FIG. 3(a) demonstrates exemplary results showing extraction percentage (i.e., the percentage of the compressed air from the turbine compressor 104 that is extracted and supplied to the air separation unit 204) versus ambient temperature. FIG. 3(b) demonstrates exemplary results showing compressor margin versus ambient temperature as the extraction percentage is varied. The compressor margin may reflect the differential between the measured pressure ratio of the turbine compressor 104 and the maximum pressure ratio at which the turbine compressor 104 may operate at a given flow rate and speed without the turbine compressor 104 experiencing surge. A minimum compressor operating limit line ("OLL") 302 may reflect the minimum acceptable compressor margin allowed by the system operator during operation of gas turbine engine 100 (i.e., an operation off-set). FIG. 3(c) demonstrates exemplary results showing turbine output (i.e., load) versus ambient temperature as the extraction percentage is varied. A maximum baseload level line 303 may reflect the maximum allowable load for the turbine 100.

As demonstrated in FIGS. 3(a), 3(b) and 3(c), the extraction percentage may be increased as the ambient temperature decreases so that the maximum baseload level and other operability limits for the turbine 100 are not exceeded. Note that the following described graphs contain data that is exemplary only and is meant only to demonstrate general gas turbine operation using the methods and systems of the current application. The points, ranges and data associated with these graphs may be substantially different for systems under alternative conditions. As shown in FIG. 3(a), at an ambient temperature of about 70° F. (21° C.), the extraction percentage may be approximately 5% (point 304). As the ambient temperature falls to about 50° F. (10° C.), the extraction percentage may be increased to approximately 7% (point 306). As demonstrated in FIG. 3(b), the compressor margin at about 70° F. (21° C.) and at an extraction percentage of approximately 5% is approximately 0.30 (point 308). The compressor margin at about 50° F. (20° C.) and at an extraction percentage of approximately 7% is approximately 0.45 (point 310). FIG. 3(c) demonstrates that at both 70° F. (21° C.) (point 312) and 50° F. (10° C.) (point 314) the maximum baseload level may be maintained through the changing ambient conditions (i.e., the load of the turbine 100 remains at the maximum baseload level line 303 as the temperature falls from 70° to 50° F. (21° to 10° C.)).

The results shown in FIGS. 3(a), 3(b) and 3(c) demonstrate several of the operational benefits to varying the amount of compressed air extracted from the turbine compressor 104. First, variable extraction of the compressed air from the turbine compressor may provide an additional control variable that allows for operational boundaries to be respected during turbine 100 operation. As shown in the FIG. 3 example discussed above, the ambient temperature decreases from 70° to 50° F. (21° to 10° C.), yet the maximum baseload level (points 312 and 314) may be maintained and an acceptable compressor margin may be maintained (the level actually increases from 0.30 to 0.45, see points 308 and 310). Further, variable extraction may allow the turbine 100 to maintain the maximum baseload level through changing ambient conditions. As is known in the art, assuming other operational factors remain constant, a reduction in ambient temperature results in an increase in turbine output. Thus, to take the above FIG. 3 example further, if the ambient temperature decreases from 70° to 50° F. (21° to 10° C.) when the turbine 100 already is functioning at maximum baseload level, the turbine operator would have to begin certain control measures in order for the turbine 100 to maintain (and not exceed) the maximum baseload level. As known in the art, these control measures may include bleeding inlet heat (i.e., bleeding off the discharge air of the turbine compressor 104 and recirculating the bleed air back to the compressor inlet), closing the inlet guide vanes, and/or reducing turbine fuel supply (i.e., reducing turbine inlet temperature). As discussed, however, such control measures reduce the thermal efficiency of the gas turbine 100 and are not as efficient as increasing the extraction percentage from the turbine compressor 104. FIGS. 3(a), 3(b) and 3(c) demonstrate that varying the extraction level may successfully prevent the gas turbine 100 from exceeding its maximum baseload level through changing ambient conditions.

Second, an increase in the supply of compressed air that is extracted from the turbine compressor 104 may decrease in an equivalent quantity the amount of compressed air needed from the main compressor 202 to supply the air separation unit 204 with the necessary amount of compressed air. This may result in decreased usage of the main compressor 202, which may increase the overall efficiency of the system by reducing the energy consumption of this component. Further, reduced usage of the main compressor 202 may reduce the maintenance cost associated therewith. As such, unlike the other known methods of controlling the load of the turbine 100, varying the extraction level of compressed air to the air separation unit 204 makes efficient use of the control measure by increasing the supply of compressed air supplied to the air separation unit 204 from the turbine compressor 104 (i.e., it lessens the output requirement of the main compressor 202 and decreases the energy consumption of that component).

If, on the other hand, the extraction percentage from the turbine compressor 104 had remained constant in the above discussed example (i.e., at the approximate 4% level of 70° F. (21° C.) as the ambient temperature decreased to 50° F. (10° C.), the operator of the turbine 100 would have been required to begin such actions as inlet bleed heat, closing the inlet guide vanes, and/or reducing turbine fuel supply in order to limit turbine output. Further, the overall system would be required to make up the difference in the amount of compressed air extracted from the turbine compressor 104 between the 4% and the 7% extraction level with the main compressor 202, which would further decrease the efficiency of the overall system.

As demonstrated in FIGS. 3(a), 3(b) and 3(c), generally, the percent extracted may be decreased as the ambient temperature rises so that the turbine output at the maximum baseload level line 303 is maintained (i.e., if the percent extracted was not reduced and other operational factors remained the same, turbine output would fall as the ambient temperature rises). At some point as the ambient temperature continues to rise, the turbine 100 may no longer be able to satisfy the load requirement of the maximum baseload level line 303 while also respecting operation boundaries (such as the compressor operating limit line 302) even if the percentage of extracted compressed air were further reduced. In FIG. 3, this occurs at approximately 80° F. (27° C.), though it may occur at other temperatures for different systems under different conditions. At such a point, extraction percentage may no longer be reduced so that maximum baseload level line 303 may be maintained without violating an operational limits of the turbine 100. Up until this point, turbine output (i.e., load) is controlled at a maximum desired level through changing ambient conditions in an efficient manner.

Figure 4A:
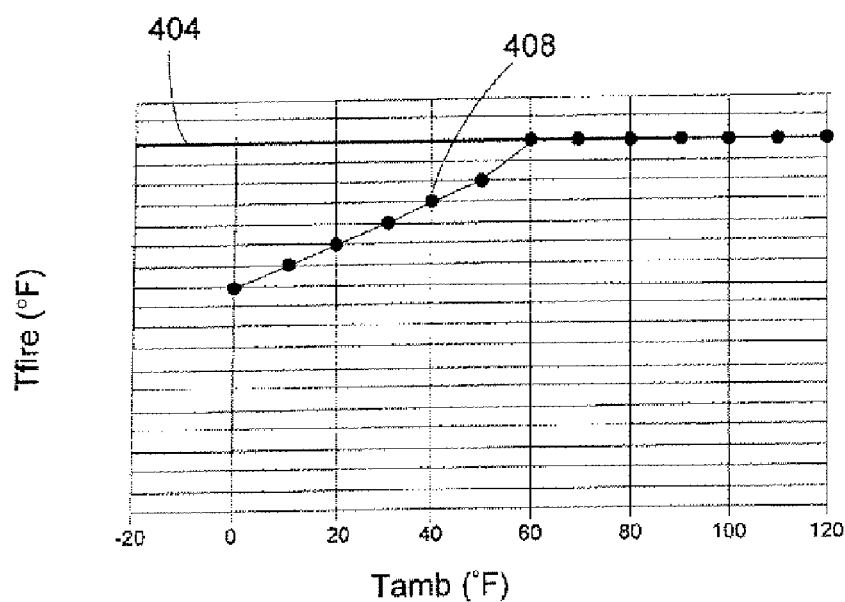
FIGS. 4(a) and 4(b) include two plots demonstrating how temperature inside the combustor 106 may be varied so that a maximum allowable temperature of the gases exiting the combustor is not exceeded as the turbine 100 operates at a constant load through changing ambient conditions.
Figure 4B:
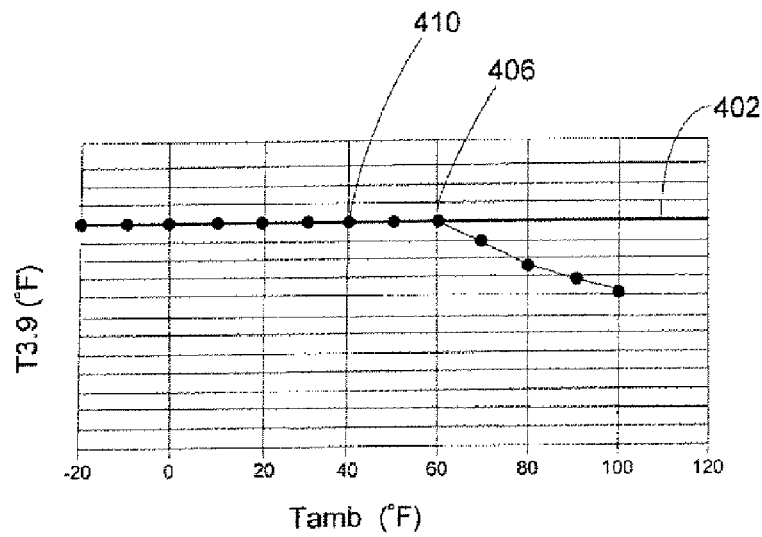

FIGS. 4(a) and 4(b) include two plots demonstrating how temperature inside the combustor 106 may be varied so that a maximum allowable temperature of the gases exiting the combustor is not exceeded as the turbine 100 operates at a constant load through changing ambient conditions. In these plots, "Tfire" represents the temperature of the gases exiting the first stage nozzle within the combustor 106 and "T3.9" represents the temperature of the gases exiting the combustor 106. As shown, as the ambient temperature decreases, Tfire may be decreased so that the maximum allowable T3.9 temperature, which is represented by a Maximum T3.9 Line 402, is not exceeded. Initially, when the ambient temperature is decreasing from about 100° to 60° F. (38° to 16° C.), Tfire may be maintained at a level that corresponds to a maximum allowable Tfire temperature, which is represented by a Maximum Tfire Line 404. Also, as the ambient temperature decreases from 100° to 60° F. (38° to 16° C.), the T3.9 temperature may increase until it reaches the Maximum T3.9 Line at a point 406. As the ambient temperature decreases beyond 60° F. (16° C.) (and, as stated, while a constant load is maintained), Tfire may be reduced so that the Maximum T3.9 Line 402 is not violated. For example, at an ambient temperature of 40° F. (4° C.), Tfire may be reduced to a level below the Maximum Tfire Line 404 (point 408) so that the T3.9 temperature does not exceed the Maximum T3.9 Line 402 (point 410).

Variable extraction (i.e., varying the amount of compressed air extracted from turbine compressor 104 for supply to the air separation unit 204) may be used to ensure that operational limits such as Maximum T3.9 Line 402 and the Maximum Tfire Line 404 are observed and system efficiency is maximized. For example, if decreasing fuel flow is used as the primary control for limiting turbine load level, the temperatures for Tfire and T3.9 are not maximized to their respective limits. On the other hand, varying extraction to maintain maximum Tfire/T3.9 temperatures is more efficient because of the direct relationship between high system temperatures and increased system efficiency. Thus, extraction may be increased during falling ambient temperatures such that maximum Tfire/T3.9 temperatures may be maintained while maximum load level are not exceeded.

Figure 5A:
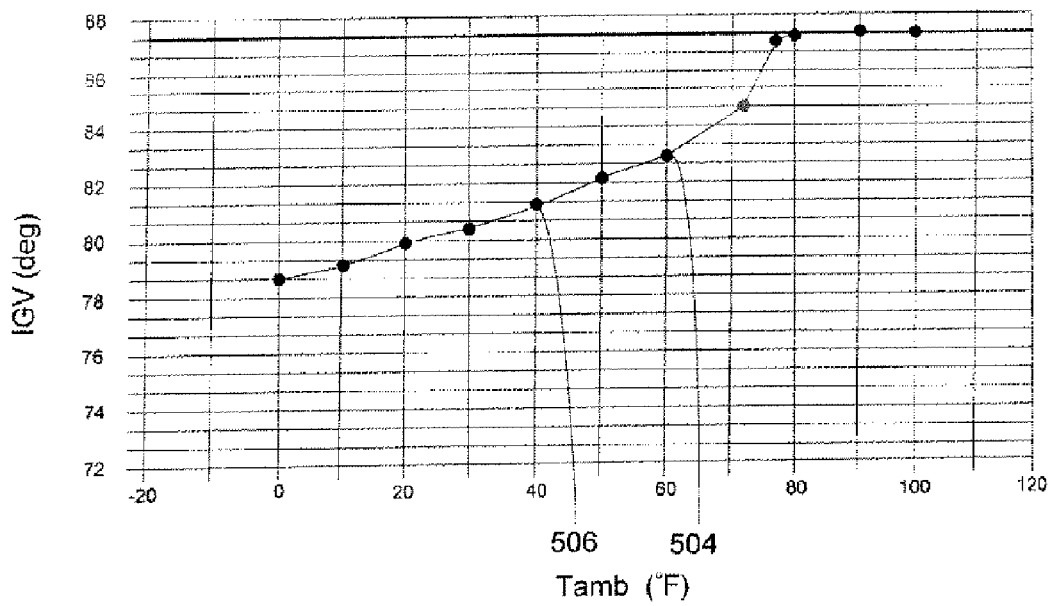
FIGS. 5(a) and 5(b) includes two plots demonstrating how the setting of the Inlet Guide Vanes may be varied so that a maximum exit mach number is not exceeded as the turbine 100 operates at a constant load through changing ambient conditions.
Figure 5B:
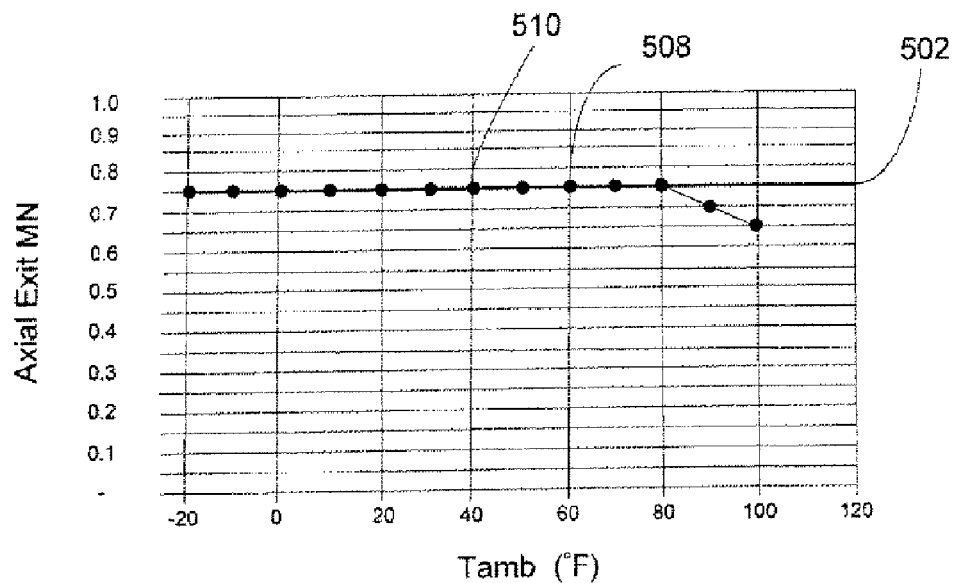

FIGS. 5(*a*) and (*b*) include two plots demonstrating how the setting of the Inlet Guide Vanes may be varied so that a maximum velocity of the fluid exiting the turbine 100 is not exceeded as the turbine 100 operates at a constant load through changing ambient conditions. In this plot, "IGV" refers to the setting (i.e., angle of orientation) of the inlet guide vanes and "Axial Exit MN" refers the velocity of the fluid as it exits the turbine 100, which also is known as the turbine mach number. As shown, as the ambient temperature decreases beyond about 80° F. (27° C.), the angle of orientation of the inlet guide vanes may be reduced (i.e., the inlet guide vanes are further "closed") so that a maximum allowable exit fluid velocity, which is represented by a Maximum Mach Number Line 502, is not exceeded. For example, from 60° to 40° F. (16° to 40° C.), the IGV angle of orientation is reduced from approximately 83° (see point 504) to 81° (see point 506) such that the exit fluid velocity is maintained at or below the Maximum Mach Number Line 502 (see points 508 and 510).

Variable extraction may be used to ensure that operational limits such as the Maximum Mach Number Line 502 are observed, while maximizing system efficiency beyond that of which the other known control means, such as manipulating the setting of the Inlet Guide Vanes, are capable. For example, increasing the percentage of compressed air extracted from the turbine compressor 104 may decrease the amount of compressor flow that is available to expand through the turbine 104, which, in turn, will decrease the velocity of the fluid as it exits the turbine. As such, when ambient temperatures are falling, the need to decrease air flow to the turbine compressor 104 through inlet guide vane manipulation may be decreased by varying (in this case, increasing) the level of extraction from the turbine compressor 104. As already discussed, varying extraction to maintain operational limits, such as the maximum allowable velocity of the fluid as it exits the turbine 100, is more efficient than closure of the inlet guide vanes because, among other things, the increased amount of extracted air may be supplied to air separation unit 204 so that the demand on the main air compressor 202 is decreased and overall system efficiency is increased.

Therefore, during the operation of the IGCC power generation system 200, the amount of compressed air extracted from turbine compressor 104 for supply to the air separation unit 204 may be varied to control the load on turbine 100 and ensure that the operational boundaries of turbine 100 are maintained such that system efficiencies are maximized. Further, an increased supply of extracted compressed air from turbine compressor 104 may reduce the energy consumption of main air compressor 202 such that the overall efficiency of the IGCC system 200 is enhanced. This method of turbine 100 control may be accomplished in several ways, including, but not by limitation, the control processes demonstrated in FIGS. 6-8.

Figure 6:
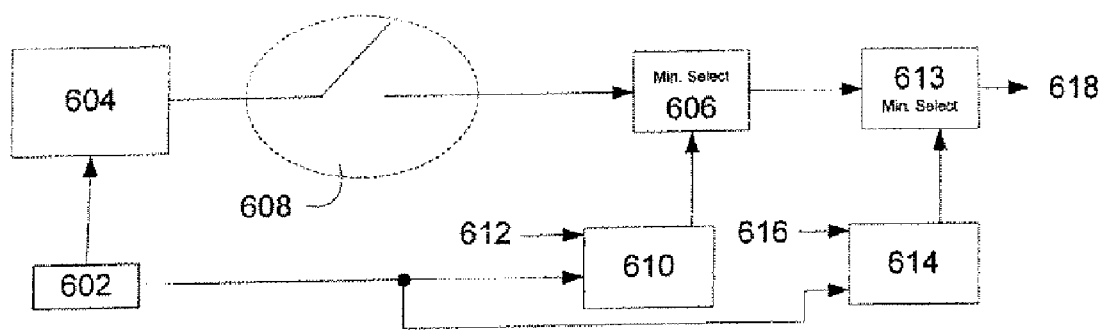
FIG. 6 is a flow diagram demonstrating an exemplary control process that may be used to set the exhaust temperature of the turbine.

FIG. 6 is a flow diagram demonstrating an exemplary control process that may be used to set the exhaust temperature ("Texh") of the turbine 100. At block 602, a pressure ratio measurement may be taken across turbine compressor 104. At 604, the pressure ratio measurement may be used to calculate Texh for a part load condition (i.e., an operating condition that is less than approximately 96% of baseload). The calculated part load Texh then may be forwarded to a "minimum select" block 606 depending on the state of a switch 608. If it is determined that the turbine 100 is operating in a part load condition, the switch 608 may be closed, allowing the calculated part load Texh to pass through to the minimum select block 606. If, on the other hand, it is determined that the turbine 100 is not operating in a part load condition, the switch 606 may reside in the open condition so that the calculated part load Texh is not forwarded to the minimum select block 606.

At a block 610, another Texh set point calculation may be completed based upon the measured compressor pressure ratio 602 and a known combustor exit temperature limit 612, which represents the maximum allowable exit temperature for the combustor 106. The calculated Texh from block 610 then may be input in the minimum select block 606. The minimum select block 606 then function to select the minimum Texh set point from the two inputs, i.e., between the inputs from block 604 (assuming switch 608 is in the closed position) and block 610.

A second minimum select, a minimum select block 613, may select the minimum calculated Texh set point from the inputs supplied to it by the minimum select block 606 and the input from a block 614. At block 614, a Texh set point calculation may be made based upon the compressor ratio measured at block 602 and a known turbine inlet temperature maximum 616 (i.e., the maximum temperature allowed at the turbine inlet). The minimum of these two inputs into minimum select block 613 may be selected and the result may become a Texh set point 618.

Figure 7:
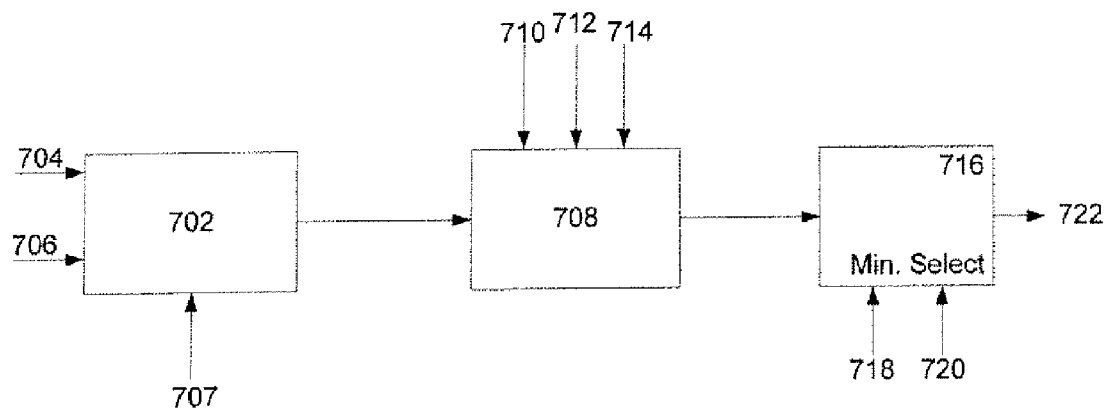
FIG. 7 is a flow diagram demonstrating an exemplary control process that may be used to calculate a set point for the inlet guide vanes (i.e., the angle of orientation of the inlet guide vanes) of a turbine.

FIG. 7 is a flow diagram demonstrating an exemplary control process that may be used to calculate a set point for the inlet guide vanes, which may determine the angle of orientation of the inlet guide vanes of the turbine 100. At a block 702, a target turbine exhaust flow rate may be calculated based upon a measured valued of the Texh 704, a measured value of the pressure of the turbine exhaust 706, and a known maximum allowable turbine exhaust flow rate 707. The target turbine exhaust flow rate that is calculated at block 702 then may be input into a block 708 along with the following: a measured ambient temperature 710, a measured ambient air pressure 712, and a measured fuel flow rate 714. With this information, a target inlet guide vane set point may be calculated per methods known in the art.

The value calculated at block 708 then may be input into a minimum select block 716. Minimum select block 716 may select the inlet guide vane set point value from the following: 1) the inlet guide vane set point calculated at block 708; a part load inlet guide vane set point calculated by methods known in the art 718; and a known maximum allowable inlet guide vane set point 720. The determined minimum at minimum select block 716 is then selected as an inlet guide vane set point 722.

Figure 8:
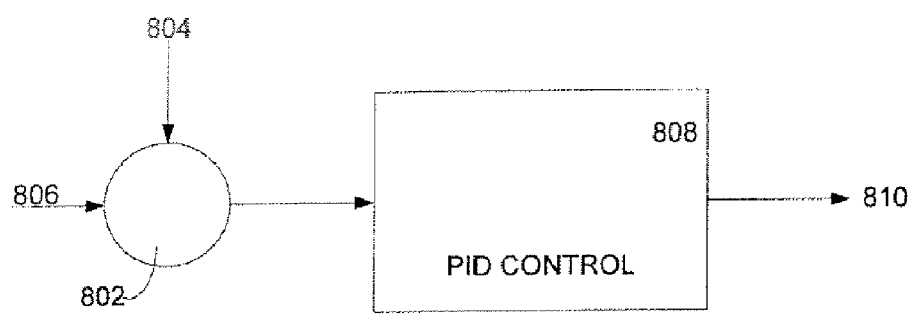
FIG. 8 is a flow diagram demonstrating an exemplary control process for calculating the turbine compressor extraction set point (i.e., the amount or percentage of the compressed air from the turbine compressor that is extracted and supplied to the air separation unit).

FIG. 8 is a flow diagram demonstrating an exemplary control process for calculating the turbine compressor 104 extraction set point (i.e., the amount or percentage of the compressed air from the turbine compressor 104 that is extracted and supplied to the air separation unit 204). At block 802, a differential may be calculated between a measured turbine load 804 and a target turbine load 806. The turbine load may be measured by devices and systems known in the art, including a precision power analyzer, a watt-hour meter or other similar devices and systems. The measured turbine load 804 may be compared to the target turbine load 806 (and a differential calculated) by devices, controllers and systems known by those of ordinary skill in the art, including a programmable logic controller or other similar devices, controllers and systems. The calculated differential then may be inputted into a load PID controller 808 or other similar device and an extraction set point 810, i.e., the amount of compressed air that should be extracted from the turbine compressor 104, may be calculated. The extraction set point 810 then may be used to set valves, such as a butterfly valve, or other similar devices within the turbine compressor 104 or the piping between the turbine compressor 104 and the air separation unit 204 such that a desired amount of compressed air is extracted from the turbine compressor 104. The compressed air that is extracted from the turbine compressor 104 then may be supplied to the air separation unit 204 via piping and valves, as described.

The overall process of extracting a variable amount of compressed air from the turbine compressor 104 and supplying the extracted compressed air to the air separation unit 204 to control turbine load, as described above, may be implemented and controlled by a computerized plant operating systems that are known by those of ordinary skill in the art. The operating systems may comprise any appropriate high-powered solid-state switching device. The operating system may be a computer; however, this is merely exemplary of an appropriate high-powered control system, which is within the scope of the application. For example, but not by way of limitation, the operating system may include at least one of a silicon controlled rectifier (SCR), a thyristor, MOS-controlled thyristor (MCT) and an insulated gate bipolar transistor. The operating system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the operating system also may be implemented using a variety of separate dedicated or programmable integrated or other electronic circuits or devices, such as hardwired electronic or logic circuits including discrete element circuits or programmable logic devices, such as PLDs, PALs, PLAs or the like. The operating system also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagram 200 may be used as the operating system. As shown a distributed processing architecture may be preferred for maximum data/signal processing capability and speed. As would be appreciated by those skilled in the art, the operating system further may control the operation (i.e., the opening, closing or other settings) of the valves and the other mechanical systems of the IGCC power generation system 200 and receive input from sensors relaying information relevant to the control of the system.

In general terms, the amount of compressed air extracted from the turbine compressor 104 may be increased if the measured turbine load is greater than the target turbine load. Similarly, the amount of compressed air extracted from the turbine compressor 104 may be decreased if the measured turbine load is less than the target turbine load. Further, if the amount of compressed air extracted from the turbine compressor 104 is increased, the supply of compressed air furnished by the main air compressor 202 may be decreased by approximately the same amount (so that the combined supply received by the air separation unit 204 remains approximately the same). If, on the other hand, the amount of compressed air extracted from the turbine compressor 104 is decreased, the supply of compressed air furnished by the main air compressor 202 may be increased by approximately the same amount.

As stated, those skilled in the art will appreciate that other control processes, methods and systems may be used to vary the extraction level so that turbine load is efficiently controlled. It should be apparent that the foregoing relates only to the preferred embodiments of the present application and that numerous changes and modifications may be made herein without departing from the spirit and scope of the application as defined by the following claims and the equivalents thereof.

What is claimed is:

1. A method of controlling a load of a gas turbine engine that is part of an integrated gasification combined-cycle power generation system that includes an air separation unit, comprising the steps of:

extracting an amount of compressed air that is compressed by a turbine compressor;

supplying the extracted amount of compressed air to the air separation unit; and varying the amount of compressed air extracted from the turbine compressor based upon a desired load for the gas turbine engine;

wherein the step of varying the amount of compressed air extracted from the turbine compressor based upon the desired load comprises measuring an actual load of the gas turbine and comparing the actual load of the gas turbine to the desired load of the gas turbine.

2. The method of claim 1, further comprising the step of supplying the air separation unit with a supply of compressed air from a main air compressor.

3. The method of claim 2, further comprising the step of varying the amount of compressed air supplied to the air separation unit by the main air compressor based upon the amount of compressed air extracted from the turbine compressor.

4. The method of claim 3, wherein a combined supply of compressed air comprises the amount of compressed air supplied to the air separation unit by the main air compressor and the amount of compressed air extracted from the turbine compressor; and wherein the combined supply of compressed air comprises a supply of compressed air that satisfies the total supply of compressed air required by the air separation unit.

5. The method of claim 2, wherein the step of varying the amount of compressed air supplied to the air separation unit by the main air compressor based upon the amount of compressed air extracted from the turbine compressor comprises the step of decreasing the amount of compressed air supplied to the air separation unit by the main air compressor when the amount of compressed air extracted from the turbine compressor is increased.

6. The method of claim 5, wherein the amount by which the compressed air supplied to the air separation unit by the main air compressor is decreased is approximately the same as the amount by which the amount of compressed air extracted from the turbine compressor is increased.

7. The method of claim 5, wherein the step of varying the amount of compressed air supplied to the air separation unit by the main air compressor based upon the amount of compressed air extracted from the turbine compressor comprises the step of increasing the amount of compressed air supplied to the air separation unit by the main air compressor when the amount of compressed air extracted from the turbine compressor is decreased.

8. The method of claim 7, wherein the amount by which the compressed air supplied to the air separation unit by the main air compressor is increased is approximately the same as the amount by which the amount of compressed air extracted from the turbine compressor is decreased.

9. The method of claim 2, further comprising the step of varying the amount of compressed air extracted from the turbine compressor based upon the ambient temperature.

10. The method of claim 9, wherein the step of varying the amount of compressed air extracted from the turbine compressor based upon the ambient temperature includes increasing the amount of compressed air extracted from the turbine compressor as the ambient temperature decreases.

11. The method of claim 10, wherein the step of varying the amount of compressed air extracted from the turbine compressor based upon the ambient temperature includes decreasing the amount of compressed air extracted from the turbine compressor as the ambient temperature increases.

12. The method of claim 1, wherein the amount by which the compressed air extracted from the turbine compressor is varied is based on the comparison of the actual load of the gas turbine against the desired load of the gas turbine engine.

13. The method of claim 1 further comprising the step of increasing the amount of compressed air extracted from the turbine compressor if when the actual load of the gas turbine is greater than the desired load of the gas turbine engine.

14. The method of claim 13, further comprising the step of decreasing the amount of compressed air extracted from the turbine compressor when the actual load of the gas turbine is measured to be less than the desired load of the gas turbine engine.

15. A system for controlling a load of a gas turbine engine that is part of an integrated gasification combined-cycle power generation system that includes an air separation unit, comprising:
a turbine compressor that compresses air;
means for extracting an amount of compressed air from the turbine compressor and means for supplying the extracted amount of compressed air to the air separation unit;
means for varying the amount of compressed air extracted from the turbine compressor based upon a desired load for the gas turbine engine; and
means for measuring an actual load of the gas turbine;
wherein the means for varying the amount of compressed air extracted from the turbine compressor based upon a desired load for the gas turbine engine comprises means for comparing the actual load of the gas turbine to the desired load of the gas turbine engine and means for varying the amount of compressed air extracted from the turbine compressor based on the comparison of the actual load of the gas turbine against the desired load of the gas turbine engine.

16. The system of claim 15, wherein the means for varying the amount of compressed air extracted from the turbine compressor based upon a desired load for the gas turbine engine comprises a PID controller.

17. The system of claim 15, further comprising a main air compressor that supplies the air separation unit with a supply of compressed air from the main air compressor.

18. The system of claim 17, further comprising means for varying the amount of compressed air supplied to the air separation unit by the main air compressor;
wherein the amount of compressed air supplied to the air separation unit by the main air compressor is varied based upon the amount of compressed air extracted from the turbine compressor.

* * * * *